US012748334B2

(12) United States Patent
Wei et al.

(10) Patent No.: US 12,748,334 B2

(45) Date of Patent: Sep. 29, 2026

(54) DISPLAY PANEL, DISPLAY PANEL MOTHERBOARD AND DISPLAY DEVICE

(71) Applicant: SUZHOU CHINA STAR OPTOELECTRONICS TECHNOLOGY CO., LTD., Suzhou (CN)

(72) Inventors: Caifeng Wei, Suzhou (CN); Chunfang Qiu, Suzhou (CN); Qiuxia Shi, Suzhou (CN); Di Wu, Suzhou (CN); Zhihao Xiong, Suzhou (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 178 days.

(21) Appl. No.: 18/703,370

(22) PCT Filed: Mar. 6, 2024

(86) PCT No.: PCT/CN2024/080236

§ 371 (c)(1),
(2) Date: Apr. 22, 2024

(87) PCT Pub. No.: WO2025/161087

PCT Pub. Date: Aug. 7, 2025

(65) Prior Publication Data

US 2025/0244631 A1 Jul. 31, 2025

(30) Foreign Application Priority Data

Jan. 30, 2024 (CN) ......................... 202410129221.2

(51) Int. Cl.

| | |
|---|---|
| ***G02F 1/16766*** | (2019.01) |
| ***G02F 1/167*** | (2019.01) |
| ***G02F 1/1685*** | (2019.01) |

(52) U.S. Cl.

CPC .......... *G02F 1/16766* (2019.01); *G02F 1/167* (2013.01); *G02F 1/1685* (2019.01)

(58) Field of Classification Search

CPC ..... G02F 1/16766; G02F 1/1685; G02F 1/167

(Continued)

(56) References Cited

U.S. PATENT DOCUMENTS 9,502,441 B2 * 11/2016 Hu ......................... H10D 86/60
2022/0269139 A1 * 8/2022 Chen ................. G02F 1/136204

(Continued)

FOREIGN PATENT DOCUMENTS

CN 1573483 B 6/2010
CN 103676370 A 3/2014

(Continued)

OTHER PUBLICATIONS

International Search Report in International application No. PCT/CN2024/080236, mailed on Sep. 10, 2024.

(Continued)

*Primary Examiner* — Sharrief I Broome

(74) *Attorney, Agent, or Firm* — PV IP PC; Christopher S. Ruprecht; Wei Te Chung

(57) ABSTRACT

A display panel, a display panel motherboard, and a display device are provided. A display area and a non-display area adjacent to the display area are disposed, and the non-display area includes an outer boundary on a side away from the display area. Metal terminals and first metal line segments are disposed in the non-display area, one end of each of the first metal line segments is connected to one of the metal terminals, and another end extends to the outer boundary. The first metal line segments include first sub-portions extending to the outer boundary, and the first sub-portions contain a metal oxide.

20 Claims, 11 Drawing Sheets

(58) Field of Classification Search
USPC .......................................................... 359/296
See application file for complete search history.

(56) References Cited

U.S. PATENT DOCUMENTS

| | | | | |
|---|---|---|---|---|
| 2023/0280806 | A1* | 9/2023 | Yi | G06F 1/26 361/679.01 |
| 2023/0305343 | A1* | 9/2023 | Liang | G02F 1/1347 |

FOREIGN PATENT DOCUMENTS

| | | | |
|---|---|---|---|
| CN | 104914629 | A | 9/2015 |
| CN | 106200180 | A | 12/2016 |
| CN | 106940494 | A | 7/2017 |
| CN | 107422559 | A | 12/2017 |
| CN | 110047412 | A | 7/2019 |
| CN | 112071209 | A | 12/2020 |
| CN | 115547199 | A | 12/2022 |
| CN | 115793345 | A | 3/2023 |
| KR | 19980020235 | A | 6/1998 |
| WO | 2023208061 | A1 | 11/2023 |

OTHER PUBLICATIONS

Written Opinion of the International Search Authority in International application No. PCT/CN2024/080236, mailed on Sep. 10, 2024.

Chinese Office Action issued in corresponding Chinese Patent Application No. 202410129221.2 dated Apr. 16, 2026, pp. 1-8.

* cited by examiner

DISPLAY PANEL, DISPLAY PANEL MOTHERBOARD AND DISPLAY DEVICE

CROSS-REFERENCE TO RELATED APPLICATIONS

This application is a national stage of International Application No. PCT/CN2024/080236, filed on Mar. 6, 2024, which claims priority to Chinese Patent Application No. 202410129221.2, filed on Jan. 30, 2024, the contents of which are hereby incorporated by reference in its entirety.

TECHNICAL FIELD

The present disclosure relates to the technical field of display, and more particularly, to a display panel, a display panel motherboard, and a display device.

BACKGROUND

Electronic paper is a paper-like electronic display, which combines the display characteristics of ordinary paper with computer display screens, and the display effect is close to that of the ordinary paper, thereby reducing visual fatigue during reading. In addition, the electronic paper can realize power-off display with ultra-low energy consumption, and has been widely used in the fields such as electronic labels, electronic signage, and electronic readers, and thus has become an increasingly important flat panel display.

To achieve lighting testing of the electronic paper panel, and to increase the yield of subsequent module segments, the electronic paper is typically connected to the test terminals of each panel through wires to realize the lighting test of each panel.

However, in the manufacturing process, it is generally necessary to cut the panel motherboard to obtain a plurality of small-size plates with preset sizes. The cutting line may pass through the wires, and thus after cutting, metal section of the wires are formed at the edge of the small-size plates, which is easy to generate static electricity, affecting the stability and display effect of the electronic paper panel.

Technical Solutions

Embodiments of the present disclosure provide a display panel, a display panel motherboard, and a display device, which can reduce static electricity generated by the display panel at first metal line segments, and improve stability and display effect of the display panel.

An embodiment of the present disclosure provides a display panel including a display area and a non-display area adjacent to the display area, the non-display area including an outer boundary on a side away from the display area;

in which the display panel further includes:

metal terminals disposed in the non-display area; and first metal line segments disposed in the non-display area, wherein one end of each of the first metal line segments is connected to one of the metal terminals, and another end extends to the outer boundary;

in which the first metal line segments include first sub-portions extending to the outer boundary, and the first sub-portions contain a metal oxide.

In accordance with the above object of the present disclosure, an embodiment of the present disclosure further provides a display panel motherboard including:

at least two sub-boards, each of the sub-boards including metal terminals;

a plurality of metal signal lines connected to the metal terminals on the sub-boards, the metal signal lines including first metal line segments connected to the metal terminals;

wherein one end of each of the first metal line segments is connected to one of the metal terminals, another end is connected to a juncture of two adjacent sub-boards, the first metal line segments include first sub-portions connected to the juncture of two adjacent sub-boards, and the first sub-portions contain a metal oxide.

In accordance with the above object of the present disclosure, an embodiment of the present disclosure further provides a display device including a display panel including a display area and a non-display area adjacent to the display area, the non-display area including an outer boundary on a side away from the display area;

the display panel further includes:

metal terminals disposed in the non-display area; and first metal line segments disposed in the non-display area, wherein one end of each of the first metal line segments is connected to one of the metal terminals, and another end extends to the outer boundary;

in which the first metal line segments include first sub-portions extending to the outer boundary, and the first sub-portions contain a metal oxide.

DETAILED DESCRIPTION OF EMBODIMENTS

Figure 1:
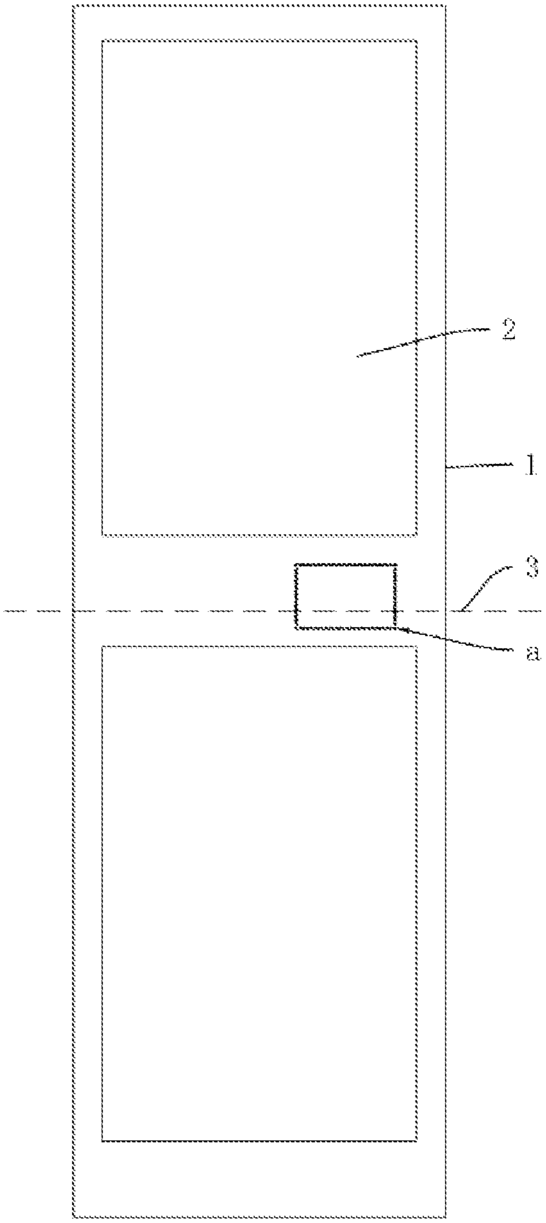
FIG. 1 is a schematic view of a cutting structure of a display panel in the related art.

Embodiments of the present disclosure will be clearly and fully described with reference to the accompanying drawings. It will be apparent that the described embodiments are only part, not all of embodiments of the present disclosure. All other embodiments disposed by a person skilled in the art, based on the embodiments of the present disclosure, without involving any inventive effort, fall within the scope of the present disclosure.

The following disclosure provides many different embodiments or examples for implementing the different structures of the present disclosure. For simplification of the present disclosure, components and arrangements from specific embodiments/examples are described below, which are described by a way of example, and are not intended to limit the disclosure. In addition, reference numerals and/or reference symbols may be repeated in different embodiments of the present disclosure, and such repetition is for the purpose of simplicity and clarity, without indicating a relationship between the various embodiments and/or arrangements discussed. Furthermore, the present disclosure provides examples of various specific processes and materials, and a person skilled in the art will recognize the application of other processes and/or the use of other materials.

Figure 2:
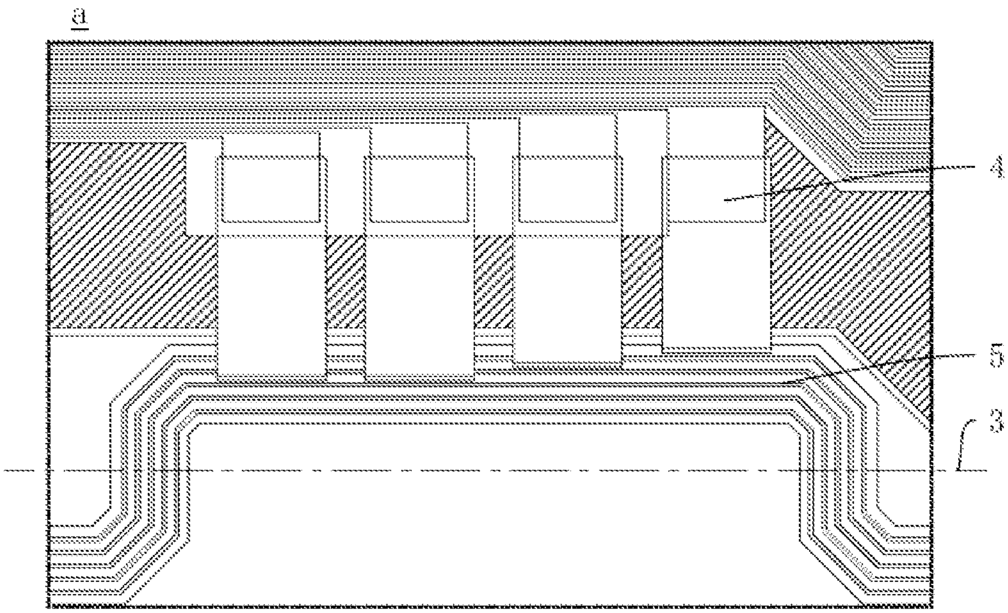
FIG. 2 is a schematic view of an enlarged structure at a in FIG. 1 in the related art.

Referring to FIGS. 1 and 2, a panel motherboard 1 needs to be cut along a cutting line 3 to create a plurality of small-size plates 2 with preset sizes in the related art. Test terminals 4 are disposed on each of the small-size plates 2, and test wires 5 are disposed on the panel motherboard 1 and connected to the test terminals 4 to carry out lighting test to the plurality of small-size plates 2 on the panel motherboard 1. However, in the process of cutting the panel motherboard 1, the cutting line 3 passes through the test wires 5, and then, sections are formed at the cut of the test wires 5 after being cut. The test wires 5 are made of a metal material, generally an elemental metal, and thus static electricity is readily generated, resulting in damage to the components and wires in the small-size plates 2 and deterioration of the display effect.

Figure 3:
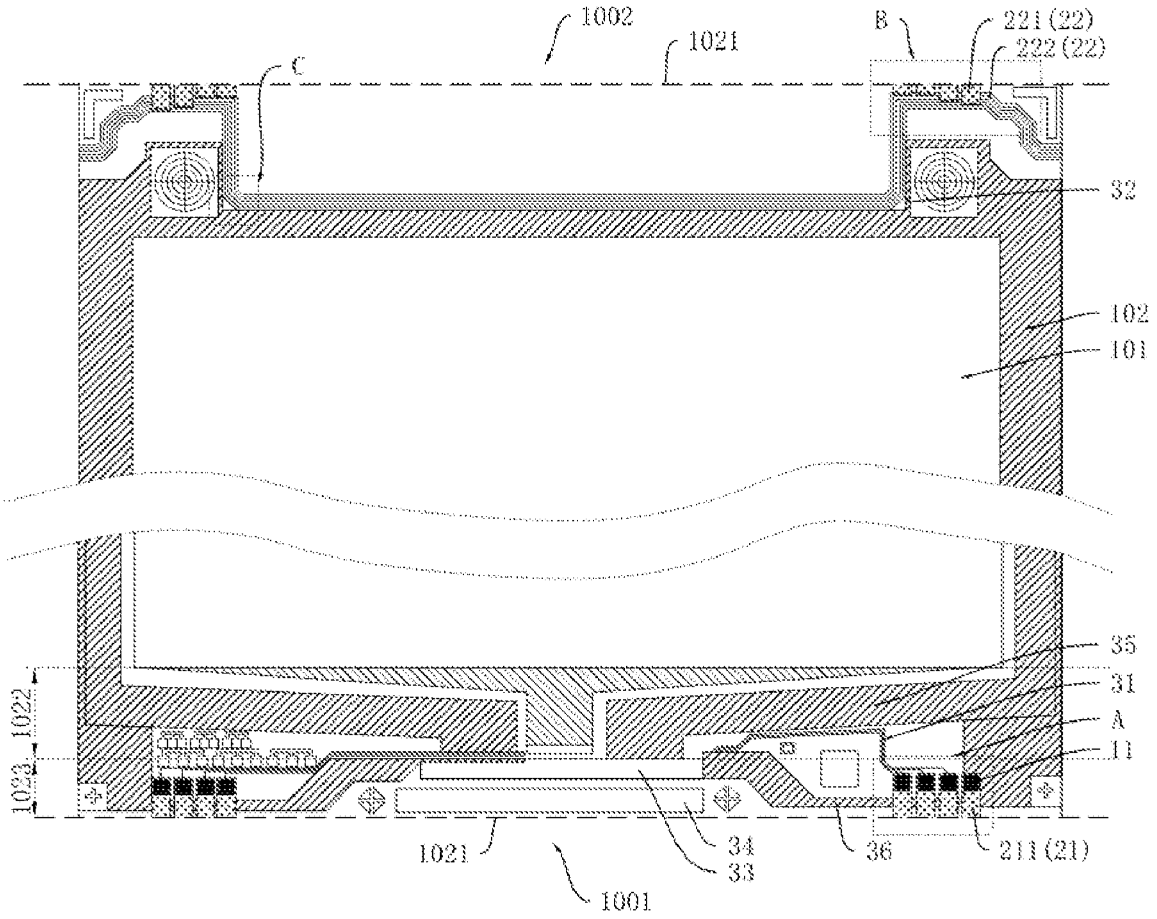
FIG. 3 is a schematic view of a structure of a display panel according to some embodiments of the present disclosure.
Figure 4:
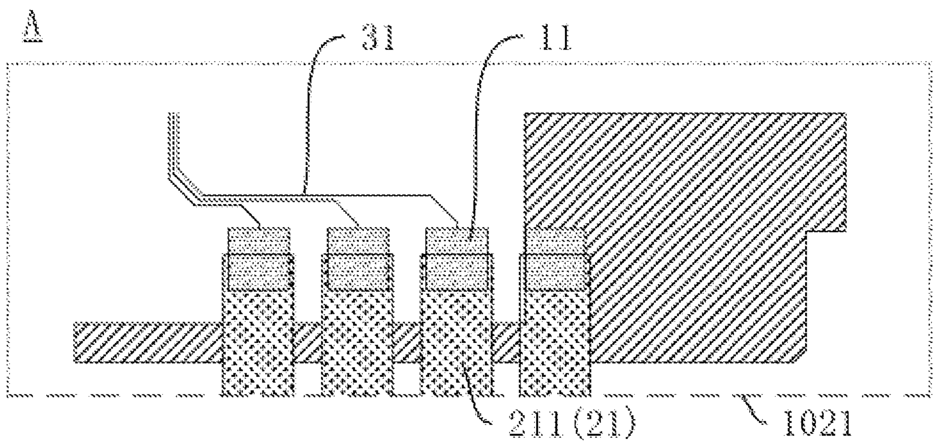
FIG. 4 is a schematic view of an enlarged structure at A in FIG. 3 according to some embodiments of the present disclosure.
Figure 5:
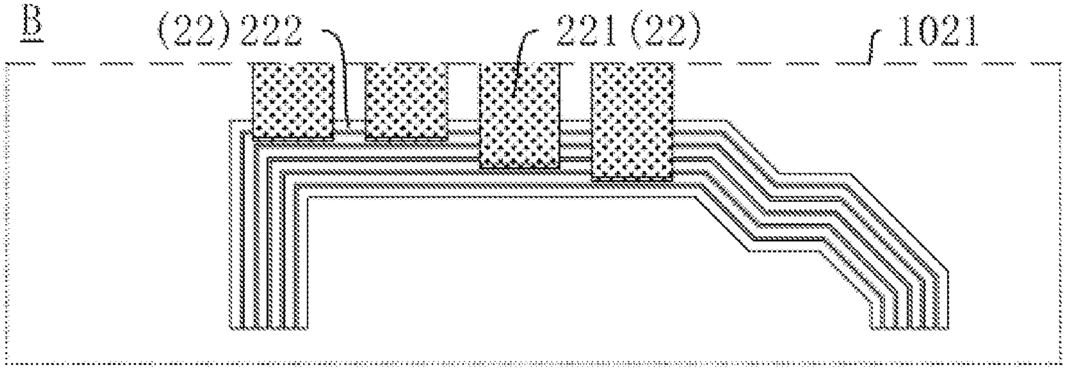
FIG. 5 is a schematic view of an enlarged structure at B in FIG. 3 according to some embodiments of the present disclosure.

Referring to FIGS. 3, 4, and 5, an embodiment of the present disclosure provides a display panel including a display area 101 and a non-display area 102 adjacent to the display area 101. The non-display area 102 includes an outer boundary 1021 on a side away from the display area 101.

The display panel further includes metal terminals 11 and first metal line segments 21. The metal terminals 11 are disposed in the non-display area 102. The first metal segments 21 are disposed in the non-display area 102, one end of each of the first metal segments 21 is connected to the corresponding one of metal terminals 11, and another end extends to the outer boundary 1021.

The first metal line segments 21 include first sub-portions 211 extending to the outer boundary 1021. The first sub-portions 211 contain a metal oxide.

In the process of implementing the present disclosure, the first sub-portions 211 for connecting the first metal line segments 21 to the outer boundary 1021 is made of a metal oxide, so that the conductivity of the first sub-portions 211 can be reduced, which in turn can reduce the static electricity generated by the first sub-portions 211, lower the probability of damage to the wires or components of the display panel caused by static electricity, and improve the stability and display effect of the display panel.

In an embodiment of the present disclosure, the display panel further includes a first side and a second side disposed opposite to each other. The first metal line segments are located on the first side. The display panel further includes second metal line segments located on the second side. The first metal line segments extend to the outer boundary on the first side, and the second metal line segments extend to the outer boundary on the second side.

Each of the first metal line segments includes a first end extending to the outer boundary on the first side, and each of the second metal line segments includes a second end extending to the outer boundary on the second side. The first end and the second end are disposed opposite to each other in a direction from the first side to the second side.

In an embodiment of the present disclosure, the second metal wire segments include second sub-portions that extend to the outer boundary on the second side, and third sub-portions connected to a side of the second sub-portions away from the outer boundary. The second sub-portions and the first sub-portions are disposed opposite to each other in the direction from the first side to the second side;

The material of the second sub-portions is the same as a material of the first sub-portions, and the material of the first sub-portions is less conductive than the material of the third sub-portions.

In an embodiment of the present disclosure, the display panel further includes functional signal lines disposed in the non-display area, and driving circuits disposed in the display area and the non-display area. The functional signal lines are electrically connected to the driving circuits, and a spacing between the second metal line segments and the functional signal lines is greater than or equal to 30 microns.

In an embodiment of the present disclosure, the first metal wire segments further include fourth sub-portions connected to the metal terminals, and fifth sub-portions connected between the first sub-portions and the fourth sub-portions. A material of the fifth sub-portions is the same as the material of the third sub-portions.

In an embodiment of the present disclosure, the display panel further includes third metal line segments disposed within the non-display area on the second side, and both ends of each of the third metal line segments extend to the outer boundary on the second side. The third metal line segments include sixth sub-portions and seventh sub-portions that both extend to the outer boundary, the sixth sub-portions and the first sub-portions are disposed opposite to each other in the direction from the first side to the second side, and the seventh sub-portions are staggered from the first sub-portions in the direction from the first side to the second side.

The material of the sixth sub-portions is the same as that of the first sub-portions, a material of the seventh sub-portions is the same as that of the first sub-portions, or the material of the seventh sub-portions is the same as that of the third sub-portions.

In an embodiment of the present disclosure, the display panel further includes fourth metal line segments disposed within the non-display area and on the first side. The fourth metal line segments include eighth sub-portions that extend to the outer boundary on the first side. The eighth sub-portions and the seventh sub-portions are disposed opposite to each other in the direction from the first side to the second side, and a material of the eighth sub-portions is the same as that of the first sub-portions, or the material of the eighth sub-portions is the same as that of the third sub-portions.

In an embodiment of the present disclosure, the material of the first sub-portions has greater chemical stability than that of the material of the third sub-portions.

In an embodiment of the present disclosure, the material of the third sub-portions comprises an elemental metal.

In an embodiment of the present disclosure, the metal terminals are disposed on the first side, and the display panel further includes a plurality of binding terminals disposed in the non-display area and on the first side, and a driver chip and a flexible circuit board connected to the binding terminals.

Specifically, with reference to FIGS. 3, 4, and 5, an embodiment of the present disclosure provides the display panel including the display area 101 and the non-display area 102 adjacent to the display area 101, wherein the non-display area 102 surrounds the periphery of the display area 101, and the non-display area 102 includes the outer boundary 1021 on a side away from the display area 101.

The display panel further includes driving circuits, display signal lines, and test wires 31 disposed in the display area 101 and the non-display area 102, for example, a pixel driving circuit disposed in the display area 101, and a gate driving circuit disposed in the non-display area 102. The display panel further includes binding terminals disposed in the non-display area 102, a driving chip 33 and a flexible circuit board 34 connected to the binding terminals, and metal terminals 11. The display signal lines are connected to binding terminals and used to connect the driver chip 33, the flexible circuit board 34, and the driver circuits to transmit the signals of the driver chip 33 to the driver circuits, thereby realizing the display function of the display panel. In addition, the test wires 31 are used to connect the metal terminals 11 to load a test signal to the metal terminals 11 during the manufacturing process of the display panel to perform a lighting test on the display panel.

In an embodiment, the number of the metal terminals 11 may be more than one, and the signals loaded in each of the metal terminals 11 may include a scanning signal, a switching signal, a common voltage signal, and the like, to transmit the signals of the scanning signal, the switching signal, the common voltage signal, and the like to each of drive circuits in the display panel through the metal terminals 11 during the lighting test.

The display panel further includes the first metal line segments 21 that are connected to the metal terminals 11 for inputting test signals to the metal terminals 11 in the manufacturing process of the display panel, and the first metal line segments 21 are residual line segments of the metal signal lines after cutting.

One end of each of the first metal line segments 21 is connected to one of the metal terminals 11, and the other end extends to the outer boundary 1021. The first metal line segments 21 include first sub-portions 211 extending to the outer boundary 1021, and the material of the first sub-portions 211 includes a metal oxide. In the embodiment of the present disclosure, the metal oxide is used to prepare a part of each of the first metal line segments 21 that is connected to the outer boundary 1021, and the section of the first metal line segments 21 is a metal oxide cross-section, so that the conductivity of the first sub-portions 211 can be reduced, the static electricity generated by the first sub-portions 211 is reduced, the probability that the wires or components in the display panel are damaged by static electricity is reduced, and the stability and the display effect of the display panel are improved.

In an embodiment of the present disclosure, referring to FIGS. 3, 4, 5, and 6, the display panel includes a first side 1001 and a second side 1002 opposite to each other, and the metal terminals 11, the driver chip 33, and the flexible circuit board 34 are disposed on the first side 1001 of the display panel.

The non-display area 102 further includes a fan-out area 1022 located on the first side 1001 and adjacent to the display area 101, and a binding area 1023 located on the side of the fan-out area 1022 away from the display area 101. The binding terminals are disposed in the binding area 1023, and the driving chip 33 and the flexible circuit board 34 are bound and connected to the binding area 1023. The display panel further includes a fan-out wire 35 connected to the driving chip 33 and extending into the fan-out area 1022. The fan-out wire 35 passes through the fan-out area 1022 and is connected to the signal wires in the display area 101, such as a data wire, a scanning wire, or the like, or to the signal wires in the non-display area 102 on the left and right sides of the display area 101, such as a clock signal wire. The metal terminals 11 may be located in the binding area 1023, and may be disposed on both left and right sides of the driver chip 33.

In the present embodiment, the first metal line segments 21 are disposed on the first side 1001 and connected to the metal terminals 11 and the outer boundary 1021 on the first side 1001. The first metal line segments 21 include first sub-portions 211 extending to the outer boundary 1021, and the material of the first sub-portions 211 includes a metal oxide.

In the present embodiment, one end of each of the first sub-portions 211 is connected to one of the metal terminals 11, and the other end extends to the outer boundary 1021 on the first side 1001.

On the first side 1001 of the display panel, the number of the metal terminals 11 may be more than one, and the metal terminals 11 may be symmetrically located at opposite sides of the first side 1001. In the embodiment of the present disclosure, a connection manner of the metal terminals 11 located at a side of the first side 1001 is used as an example for description.

The display panel includes second metal line segments 22 disposed on the second side 1002, and the second metal line segments 22 are connected to the outer boundary 1021 disposed on the second side 1002. Specifically, the second metal line segments 22 include second sub-portions 221 extending to the outer boundary 1021 on the second side 1002, and third sub-portions 222 connected to a side of the second sub-portions 221 away from the outer boundary 1021.

Each of the first metal line segment 21 includes the first end extending to the outer boundary 1021 on the first side 1001, and each of the second metal line segments 22 includes the second end extending to the outer boundary 1021 on the second side 1002. The first end and the second end are disposed opposite to each other in the direction from the first side 1001 to the second side 1002.

Specifically, the second sub-portions 221 are disposed opposite to the first sub-portions 211 in the direction from the first side 1001 to the second side 1002, and the material of the second sub-portions 221 is the same as that of the first sub-portions 211, and the material of the third sub-portions 222 is different from that of the first sub-portions 211.

In an embodiment, the conductivity of the material of the first sub-portions 211 is less than that of the material of the third sub-portions 222, and the conductivity of the material of the second sub-portions 221 is less than that of the material of the third sub-portions 222, so that the static electricity generated by the first sub-portions 211 and the second sub-portions 221 connected to the outer boundary 1021 can be reduced, the probability that the components and the wires inside the display panel are damaged by the static electricity can be reduced, and the yield and the display effect of the display panel can be improved.

In an embodiment, the chemical stability of the material of the first sub-portions 211 is greater than that of the material of the third sub-portions 222, and the chemical stability of the material of the second sub-portions 221 is greater than that of the material of the third sub-portions 222, that is, the metal inertness of the material of the first sub-portions 211 and the second sub-portions 221 are greater than the metal inertness of the material of the third sub-portions 222, so that the probability of water vapor intruding into the interior of the display panel from the first sub-portions 211 and the second sub-portions 221 can be reduced, the probability of water vapor intruding into the interior of the display panel from the first metal line segments 21 is reduced, and the yield and display effect of the display panel are further improved.

The material of the first sub-portions 211 and the second sub-portions 221 may include a metal oxide such as indium tin oxide, indium zinc oxide, or zinc oxide. The material of the third sub-portions 222 may include an elemental metal, such as metal copper.

It can be understood that the display panel includes a substrate and a gate layer, a source/drain layer, and a pixel electrode layer disposed on the substrate, in which the first sub-portions 211 and the second sub-portions 221 may be located in the pixel electrode layer, and the third sub-portions 222 may be located in the gate layer or the source/drain layer. The second sub-portions 221 and the third sub-portions 222 may be lapped to each other by vias when the second sub-portions 211 and the third sub-portions 222 are located in different film layers.

Further, the metal terminals 11 may be located in the gate layer or the source/drain layer, and the first sub-portions 211 and the metal terminals 11 may be located in different layers. Therefore, the first sub-portions 211 may also be lapped to the metal terminals 11 through the vias.

In an embodiment, a signal lead 36 is disposed between the metal terminals 11 and the outer boundary 1021 on the first side 1001, and the signal lead 36 may be disposed in the same layer as the metal terminals 11. The first sub-portions 211 need to span the signal lead 36 and lap the metal terminals 11 through vias. The signal lead 36 may include a common voltage signal line.

Figure 6:
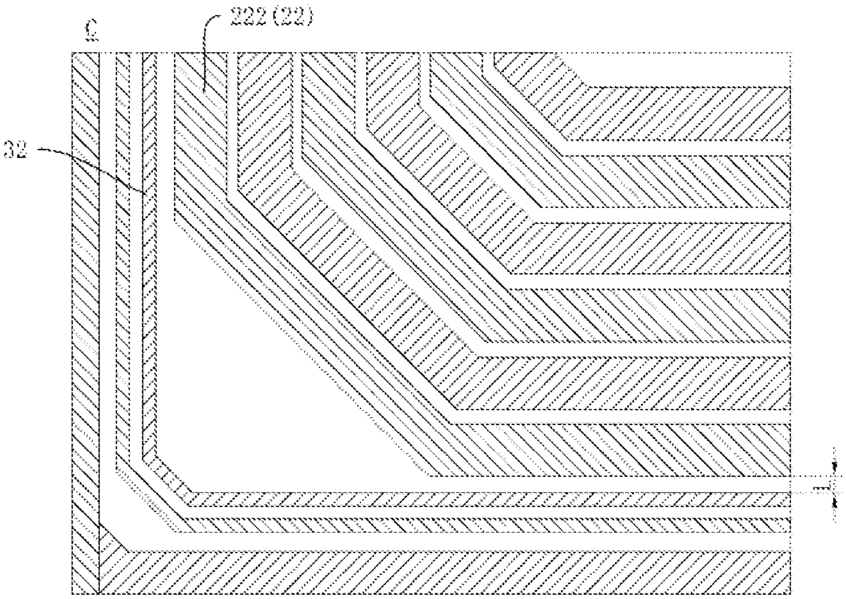
FIG. 6 is a schematic view of an enlarged structure at C in FIG. 3 according to some embodiments of the present disclosure.

Further, the display panel includes functional signal lines 32 disposed in the non-display area 102, and the functional signal lines 32 are electrically connected to the driving circuits. On the second side 1002 of the display panel, the spacing L between the second metal line segment 22 and the functional signal line 32 is greater than or equal to 30 μm, as shown in FIG. 6. Since the second metal wire segments 22 are in a suspended state after the cutting process and are connected to the panel wires or other elements, the second metal wire segments 22 are prone to accumulate static electricity, causing electrostatic damage to the adjacent wires. Therefore, as described in the embodiment, by increasing the distance between the second metal wire segment 22 and the functional signal wire 32, the probability that the functional signal wires 32 are damaged is reduced and the yield and stability of the display panel is improved.

According to the embodiments of the present disclosure, the first sub-portions 211 for connecting the first metal line segments 21 to the outer boundary 1021 are made of a metal oxide, so that the conductivity of the first sub-portions 211 can be reduced, which in turn can reduce the static electricity generated by the first sub-portions 211 and lower the probability of damage to the wires or components of the display panel caused by static electricity. The first sub-portions 211 are made of a metal oxide, so that the probability of water vapor intruding into the interior of the display panel from the first metal line segments 21 can be reduced, and the stability and the display effect of the display panel can be improved.

Figure 7:
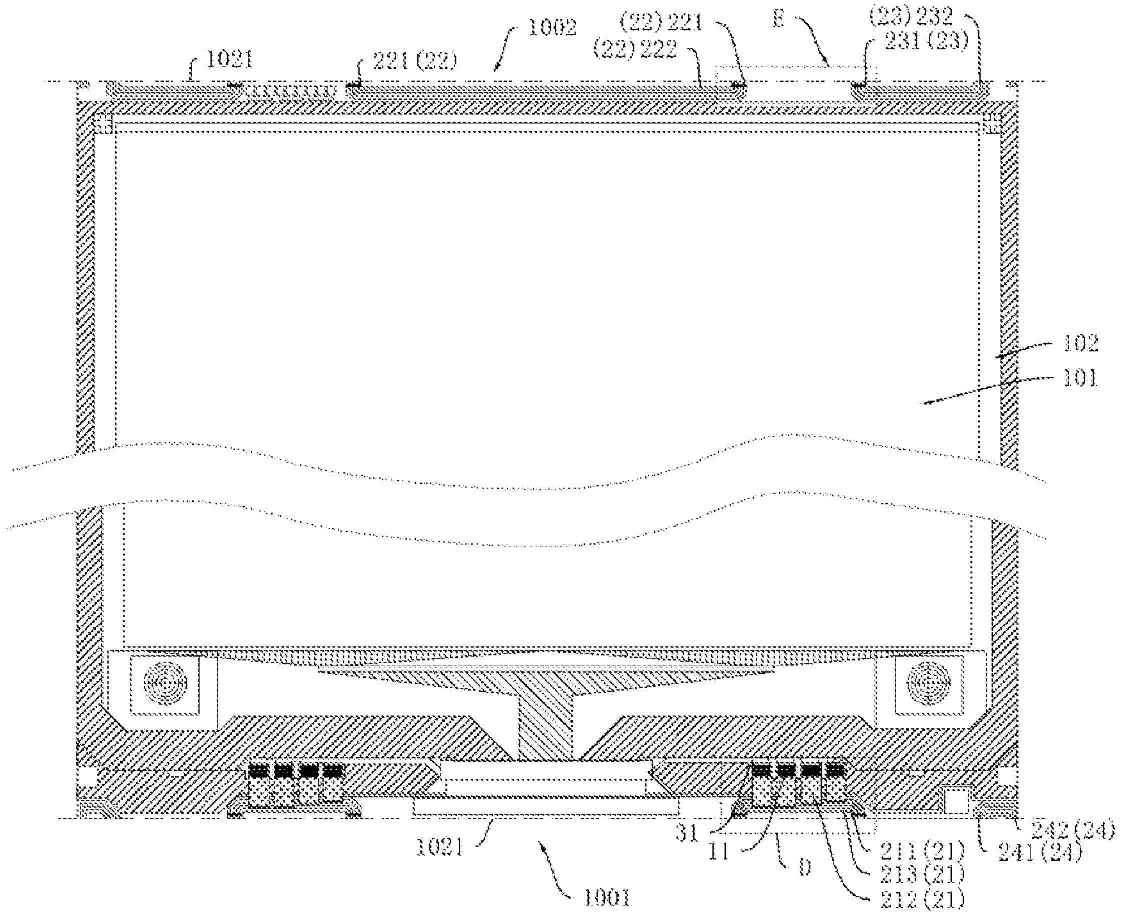
FIG. 7 is a schematic view of another structure of a display panel according to some embodiments of the present disclosure.
Figure 8:
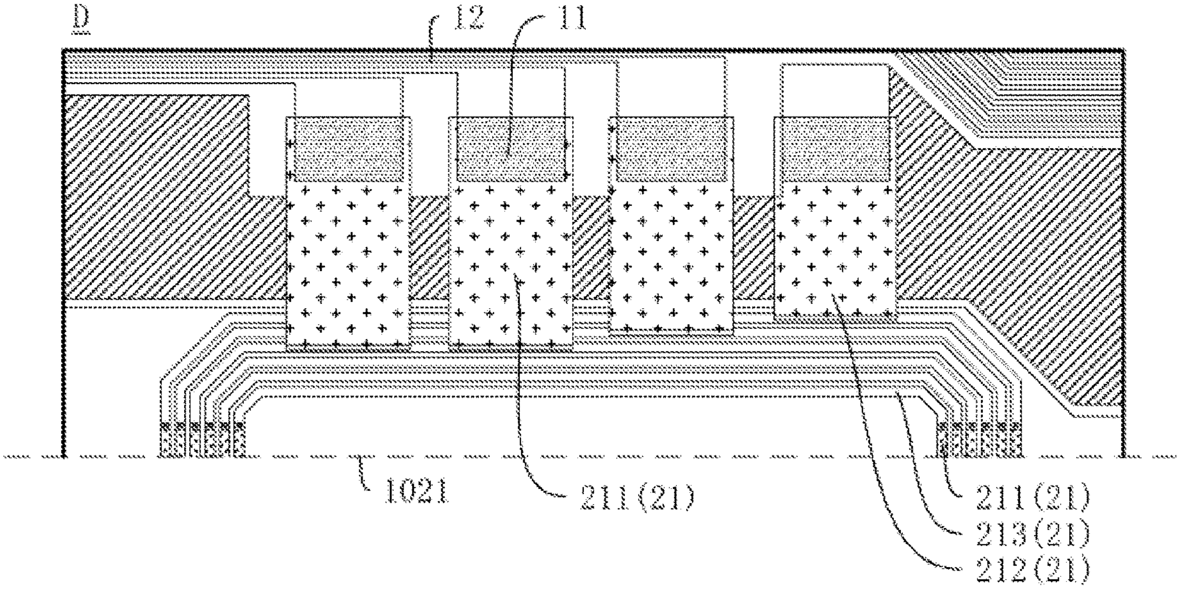
FIG. 8 is a schematic view of an enlarged structure at D in FIG. 7 according to some embodiments of the present disclosure.
Figure 9:
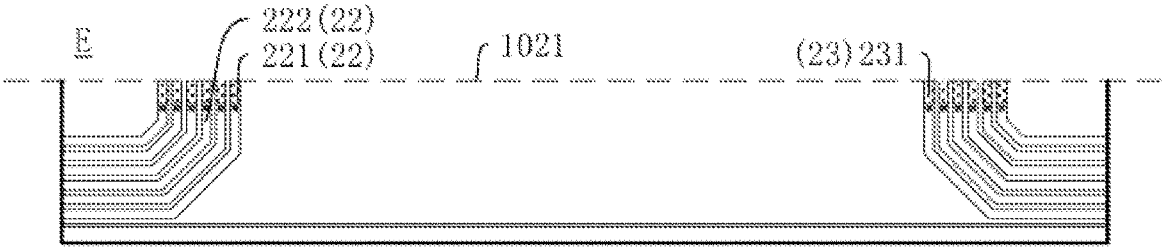
FIG. 9 is a schematic view of an enlarged structure at E in FIG. 7 according to some embodiments of the present disclosure.

In another embodiment of the present disclosure, referring to FIGS. 7, 8 and 9, the present embodiment differs from the previous embodiments in that, the display panel includes first metal line segments 21 disposed on the first side 1001, second metal line segments 22 and third metal line segments 23 disposed on the second side 1002, and fourth metal line segments 24 disposed on the first side 1001.

One end of each of the first metal line segments 21 is connected to one of the metal terminals 11, and the other end extends to the outer boundary 1021 on the first side 1001. The first metal line segments 21 include first sub-portions 211 extending to the outer boundary 1021, fourth sub-portions 212 connected to one of the metal terminals 11, and fifth sub-portions 213 connected between the first sub-portions 211 and the fourth sub-portions 212.

In an embodiment, the material of the first sub-portions 211 is the same as the material of the fourth sub-portions 212, the conductivity of the material of the first sub-portions 211 is less than the conductivity of the material of the fifth sub-portions 213, and the chemical stability of the material of the first sub-portions 211 is greater than the chemical stability of the material of the fifth sub-portions 213. Further, in the display panel of the embodiment of the present disclosure, the conductivity of the first sub-portions 211 extending to the outer boundary 1021 is reduced, the static electricity generated by the first sub-portions 211 is lowered, the probability that the wires or the components in the display panel are damaged by the static electricity is reduced, and the stability of the display panel and the display effect is improved. Further, according to the embodiment of the present disclosure, the probability of water vapor intruding into the interior of the display panel from the first metal line segments 21 can be reduced, and the yield and the display effect of the display panel can be further improved.

In an embodiment, the material of the first sub-portions 211 and the material of the fourth sub-portions 212 may include a metal oxide, and the first sub-portions 211 and the fourth sub-portions 212 may be located in the pixel electrode layer, the material of the fifth sub-portions 213 may include an elemental metal, and the fifth sub-portions 213 may be located in the source/drain layer or the gate layer, and the first sub-portions 211, the fourth sub-portions 212, and the fifth sub-portions 213 may be lapped through vias when the first sub-portions 211, the fourth sub-portions 212, and the fifth sub-portions 213 are located in different film layers.

Both ends of each of the second metal line segments 22 extend to the outer boundary 1021 on the second side 1002, respectively, and the second metal line segments 22 include the second sub-portions 221 extending to the outer boundary 1021, and the third sub-portions 222 connected to a side of the second sub-portions 221 away from the outer boundary 1021. The second sub-portions 221 and the first sub-portions 211 are disposed opposite to each other in the direction from the first side 1001 to the second side 1002.

In an embodiment, the material of the first sub-portions 211 is the same as the material of the second sub-portions 221, the material of the third sub-portions 222 may be the same as the material of the fifth sub-portions 213, the material of the first sub-portions 211 is less conductive than the material of the third sub-portions 222, and the chemical stability of the material of the first sub-portions 211 is greater than the chemical stability of the material of the third sub-portions 222. Further, in the display panel of the embodiment of the present disclosure, the conductivity of the first sub-portions 211 and the second sub-portions 221 extending to the outer boundary 1021 is reduced, the static electricity generated by the first sub-portions 211 and the second sub-portions 221 is lowered, the probability that the wires or components in the display panel are damaged by the static electricity is reduced, and the stability of the display panel and the display effect is improved. Further, according to the embodiment of the present disclosure, the probability of water vapor intruding into the interior of the display panel from the first metal line segments 21 can be reduced, and the yield and the display effect of the display panel can be further improved.

In an embodiment, the material of the first sub-portions 211 and the material of the second sub-portions 221 may include a metal oxide, and the first sub-portions 211 and the second sub-portions 221 may be located in the pixel electrode layer, the material of the third sub-portions 222 may include an elemental metal, and the third sub-portions 222 may be located in the source/drain layer or the gate layer, and the first sub-portions 211, the second sub-portions 221, and the third sub-portions 222 may be lapped through vias when the first sub-portions 211, the second sub-portions 221, and the third sub-portions 222 are located in different film layers.

Both ends of each of the third metal line segments 23 extend to the outer boundary 1021 on the second side 1002, and the third metal line segments 23 include sixth sub-portions 231 and seventh sub-portions 232 extending to the outer boundary 1021 on the second side 1002, the sixth sub-portions 231 are positioned opposite to the first sub-portions 211 in the direction of the first side 1001 to the second side 1002, and the seventh sub-portions 232 are staggered from the first sub-portions 211 in the direction of the first side 1001 to the second side 1002.

In an embodiment, the material of the sixth sub-portions 231 is the same as the material of the first sub-portions 211, and may be located in the pixel electrode layer. The material of the seventh sub-portions 232 may be the same as the material of the first sub-portions 211, and may be located in the pixel electrode layer, or the material of the seventh sub-portions 232 may be the same as the material of the third sub-portions 222, and may be located in the gate layer or the source/drain layer.

Both ends of each of the fourth metal line segments 24 extend to the outer boundary 1021 on the first side 1001, and the fourth metal line segments 24 include eighth sub-portions 241 and ninth sub-portions 242 that extend to the outer boundary 1021 on the first side 1001, and the eighth sub-portions 241 and the seventh sub-portions 232 are disposed opposite to each other in the direction of the first side 1001 to the second side 1002, and the ninth sub-portions 242 and the seventh sub-portions 232 are staggered in the direction of the first side 1001 to the second side 1002.

In an embodiment, the material of the eighth sub-portions 241 is the same as the material of the first sub-portions 211, and may be located in the pixel electrode layer, or the material of the eighth sub-portions 241 is the same as the material of the third sub-portions 222, and may be located in the gate layer or the source/drain layer. The material of the ninth sub-portions 242 may be the same as that of the first sub-portions 211, and may be located in the pixel electrode layer, or the material of the ninth sub-portions 242 is the same as that of the third sub-portions 222, and may be located in the gate layer or the source/drain layer.

It can be understood that since the second metal line segments 22, the third metal line segments 23 and the fourth metal line segments 24 are not directly connected to the metal terminals 11 (that is, the second metal line segments 22, the third metal line segments 23 and the fourth metal line segments 24 are not directly connected to the in-plane wires), the ends of the second metal line segments 22, the third metal line segments 23 and the fourth metal line segments 24 that are connected to the outer boundary 1021 can be prepared with a material other than a metal oxide. The first metal line segments 21 are directly connected to the metal terminals 11, and the ends of the first metal line segments 21 connected to the outer boundary 1021 need to be prepared with a metal oxide to reduce the static electricity generated by the first metal line segments 21 and reduce the probability of water vapor intruding into the interior of the display panel from the first metal line segments 21, thereby improving the stability and display effect of the display panel.

According to the embodiments of the present disclosure, the first sub-portions 211 for connecting to the first metal wire segments 21 to the outer boundary 1021 are prepared with a metal oxide, so that the conductivity of the first sub-portions 211 can be reduced, the static electricity generated by the first sub-portions 211 is reduced, and the probability that the wires or components in the display panel are damaged by static electricity is reduced. The first sub-portions 211 are made of a metal oxide, so that the probability of water vapor intruding into the interior of the display panel from the first metal line segments 21 can be reduced, and the stability of the display panel and the display effect can be improved.

It can be understood that, in the display panel provided in the embodiments of the present disclosure, the number of the first metal line segments 21, the second metal line segments 22, the third metal line segments 23, and the fourth metal line segments 24 may be a plurality, and the structure and the connection manner of each of the first metal line segments 21, each of the second metal line segments 22, each of the third metal line segments 23, and each of the fourth metal line segments 24 may be disposed with reference to the above embodiments, and details are not described again.

Figure 10:
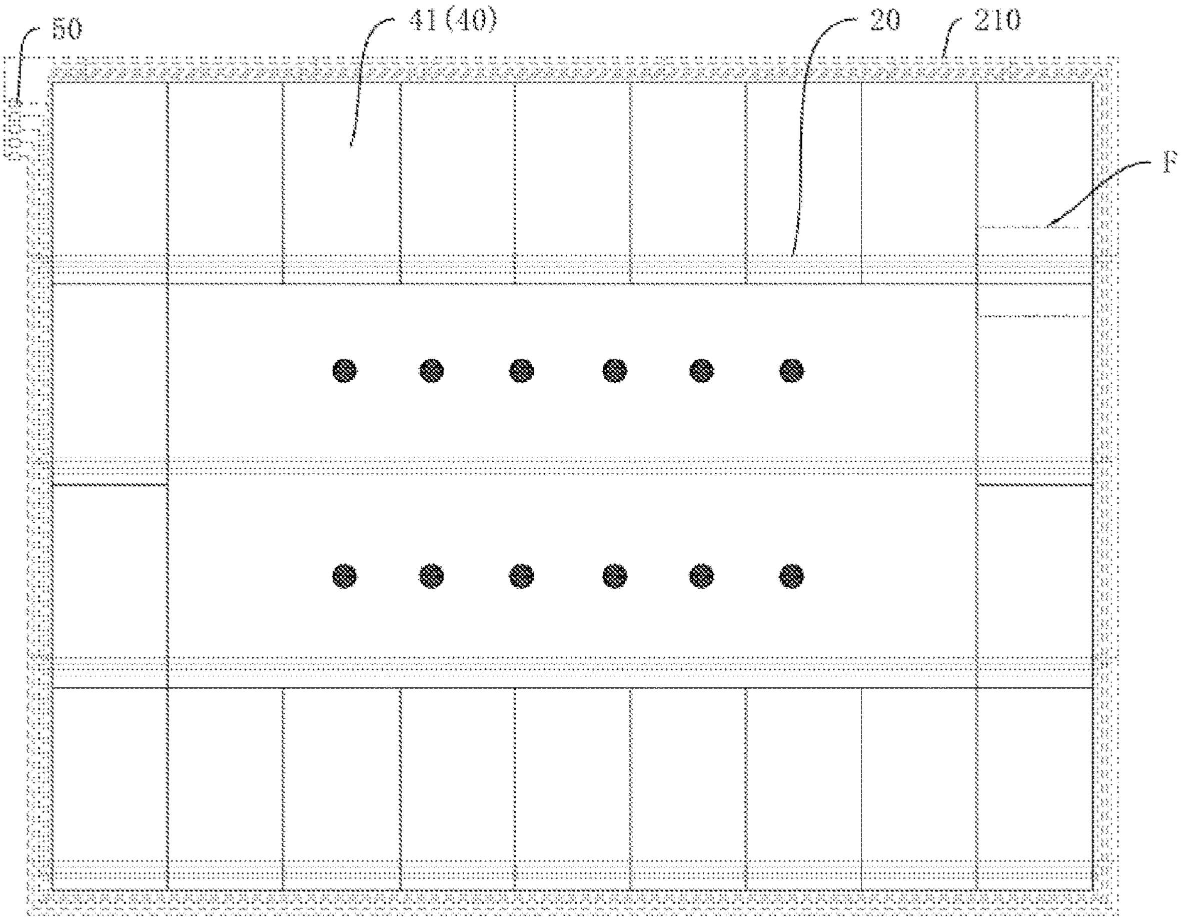
FIG. 10 is a schematic view of a structure of a display panel motherboard according to some embodiments of the present disclosure.
Figure 11:
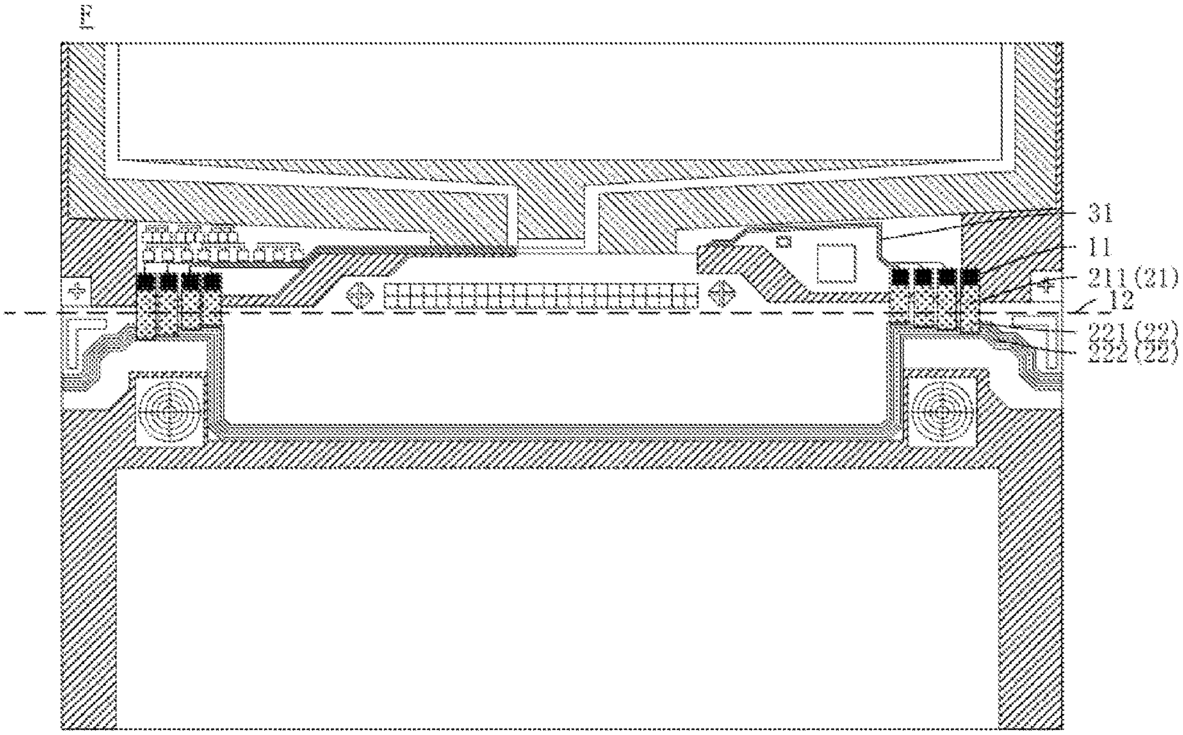
FIG. 11 is a schematic view of an enlarged structure at F in FIG. 10 according to some embodiments of the present disclosure.
Figure 12:
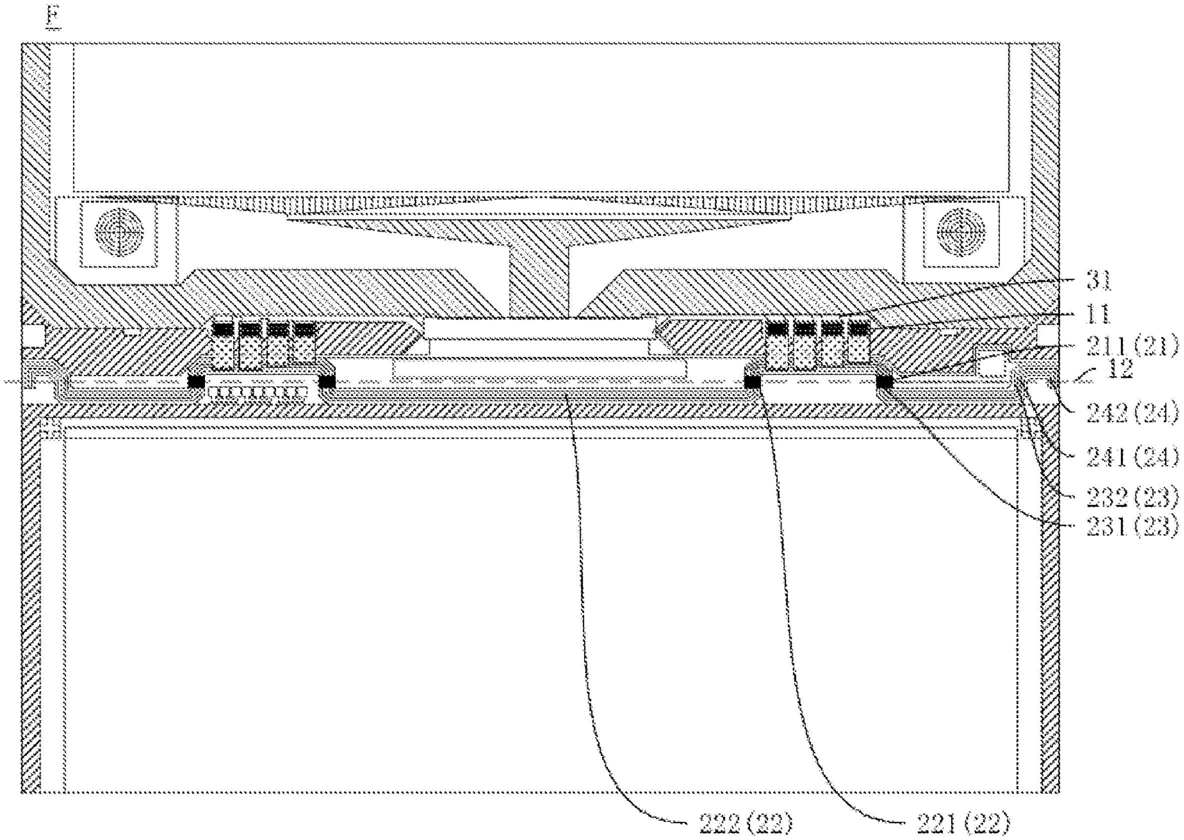
FIG. 12 is a schematic view of another enlarged structure at F in FIG. 10 according to some embodiments of the present disclosure.

Moreover, an embodiment of the present disclosure further provides a display panel motherboard. Referring to FIGS. 10, 11, and 12, the display panel motherboard 40 includes at least two sub-boards 41.

It can be understood that the display panel motherboard 40 is subjected to a cutting process to obtain at least two separated sub-boards 41, followed by a binding process or the like to obtain a display panel as described in the above-described embodiments.

The sub-boards 41 include metal terminals 11, and the display panel motherboard 40 includes a plurality of metal signal lines 20. The plurality of metal signal lines 20 are connected to the metal terminals 11 on the sub-boards 41, and the metal signal lines 20 include first metal line segments 21 connected to the metal terminals 11.

Further, one end of each of the first metal line segments 21 is connected to one of the metal terminals 11, and the other end is connected to the juncture of two adjacent sub-boards 41. The first metal line segments 21 include first sub-portions 211 connected to the juncture of two adjacent sub-boards 41. The first sub-portions 211 contain a metal oxide.

It can be understood that the display panel motherboard according to an embodiment of the present disclosure includes a cutting line 12 between two adjacent sub-boards 41, i.e., the juncture of two adjacent sub-boards 41 is the cutting line 12, and one end of each of the first metal line segments 21 is connected to one of the metal terminals 11, and the other end is connected to the juncture of two adjacent sub-boards 41.

That is, in the embodiments of the present disclosure, in the metal signal lines 20, the material of the first sub-portions 211 connected to the cutting line 12 in the first metal line segments 21 that are connected to the metal terminals 11 is a metal oxide, and the section of the first metal line segments 21 directly connected to the metal terminals 11 after the display panel motherboard is cut along the cutting line 12 is a metal oxide cross-section, so that the conductivity of the first sub-portions 211 can be reduced, the static electricity generated by the first sub-portions 211 is reduced, and the probability of electrostatic damage to the wires or components in the display panel is reduced. The first sub-portions 211 are made of a metal oxide, so that the probability of water vapor intruding into the interior of the display panel from the first metal line segments 21 can be reduced, and the stability of the display panel and the display effect can be improved.

It can be understood that the display panel motherboard 40 may include a plurality of sub-boards 41, and transmission signal lines 210 and input terminals 50 disposed on the periphery of the plurality of sub-boards 41. The transmission signal lines 210 are connected to the input terminals 50 and are disposed around the plurality of sub-boards 41, and the metal signal lines 20 are located between two adjacent rows of sub-boards 41, and two ends of each of the metal signal lines 20 in the row direction are connected to the transmission signal lines 210 to realize the transmission of test signals from the input terminals 50 to the respective sub-boards 41.

It can be understood that the number of metal signal lines 20 may be a plurality to transmit a plurality of signals required for testing, such as a scanning signal, a switching signal, and a common voltage signal to each sub-board 41.

In an embodiment of the present disclosure, referring to FIGS. 10 and 11, the cutting line 12 is positioned between two adjacent ones of the sub-boards 41 disposed in the column direction, and each of the metal signal lines 20 directly is connected to the metal terminals 11 and the part of the metal signal lines 20 overlapped with the cutting line 12 is prepared with a metal oxide.

Specifically, after the display panel motherboard 40 is cut along the cutting line 12, the metal signal lines 20 are cut into the first metal line segments 21 and the second metal line segments 22. After the same metal signal line 20 is cut, the generated first metal line segments 21 are located in the upper sub-board 41 in FIG. 11, and the generated second metal line segments 22 are located in the lower sub-board 41 in FIG. 11. For another sub-board 41, the first metal line segments 21 are formed on the lower side of the sub-board 41, and the second metal line segments 22 are formed on the upper side of the sub-board 41.

It is to be understood that the material and connection of the first and second metal segments 21 and 22 in the sub-boards 41 are the same as in the embodiment shown in FIG. 3 and will not be repeated herein.

Among the two adjacent sub-boards 41 disposed in the column direction, the first sub-portions 211 of the first metal line segments 21 located on the upper sub-board 41 are connected to the second sub-portions 221 of the second metal line segments 22 located on the lower sub-board 41.

In another embodiment of the present disclosure, referring to FIGS. 10 and 12, between two adjacent sub-boards 41 disposed in the column direction, the cutting line 12 is positioned between the two sub-boards 41, and each of the metal signal lines 20 directly is connected to the metal terminals 11 and the part of the metal signal lines 20 overlapped with the cutting line 12 is prepared with a metal oxide.

Specifically, after the display panel motherboard 40 is cut along the cutting line 12, the metal signal lines 20 are cut into the first metal line segments 21, the second metal line segments 22, the third metal line segments 23, and the fourth metal line segments 24. After the same metal signal line 20 is cut, the first metal line segment 21 and the fourth metal line segment 24 are formed in the upper sub-board 41 in FIG. 11, the second metal line segment 22 and the third metal line segment 23 are formed in the lower sub-board 41 in FIG. 11. For another sub-board 41, the first metal line segment 21 and the fourth metal line segment 24 are formed on the lower side of the sub-board 41, and the second metal line segment 22 and the third metal line segment 23 are formed on the upper side of the sub-board 41.

It is to be understood that the first metal line segments 21, the second metal line segments 22, the third metal line segments 23, and the fourth metal line segments 24 in the sub-boards 41 are the same as the embodiment as to the material and connection shown in FIG. 7, and will not be repeated further herein.

Among two adjacent sub-boards 41 disposed in the column direction, the first sub-portions 211 of the first metal line segments 21 in the upper sub-board 41 are connected to the second sub-portions 221 of the second metal line segments 22 and the sixth sub-portions 231 of the third metal line segments 23 in the lower sub-board 41, and the eighth sub-portions 241 of the fourth metal line segments 24 in the upper sub-board 41 are connected to the seventh sub-portions 232 of the third metal line segments 23 in the lower sub-board 41.

After cutting, the metal signal lines 20 are divided in the upper sub-boards 41 and the lower sub-boards 41, so that the upper side and the lower side of the display panel generated by the sub-boards 41 both include the metal line segments. However, it can be understood that with reference to FIGS. 10, 13, and 14, in the display panel motherboard 40, the plurality of sub-boards 41 include a row of edge sub-boards 411 located on the uppermost side of the display panel motherboard 40. Since the metal signal lines 20 are located only on the underside of the edge sub-boards 411, the metal line segments generated after cutting are also located only on the underside of the edge sub-boards 411.

Figure 13:
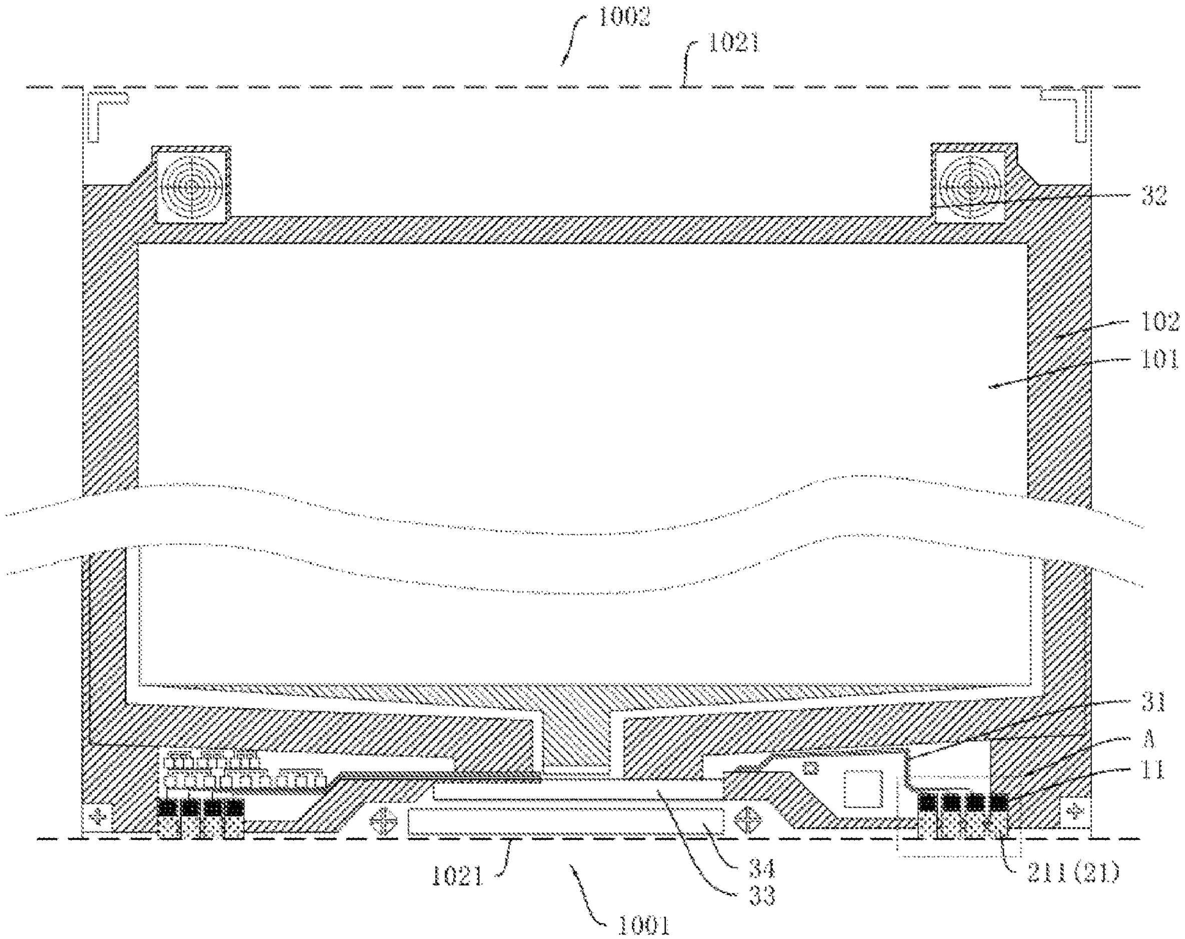
FIG. 13 is a schematic view of another structure of a display panel according to some embodiments of the present disclosure.

In an embodiment, as shown in FIG. 13, the display panel obtained by the edge sub-boards 411 includes only the first metal line segments 21 on the first side 1001 with respect to the display panel shown in FIG. 3.

Figure 14:
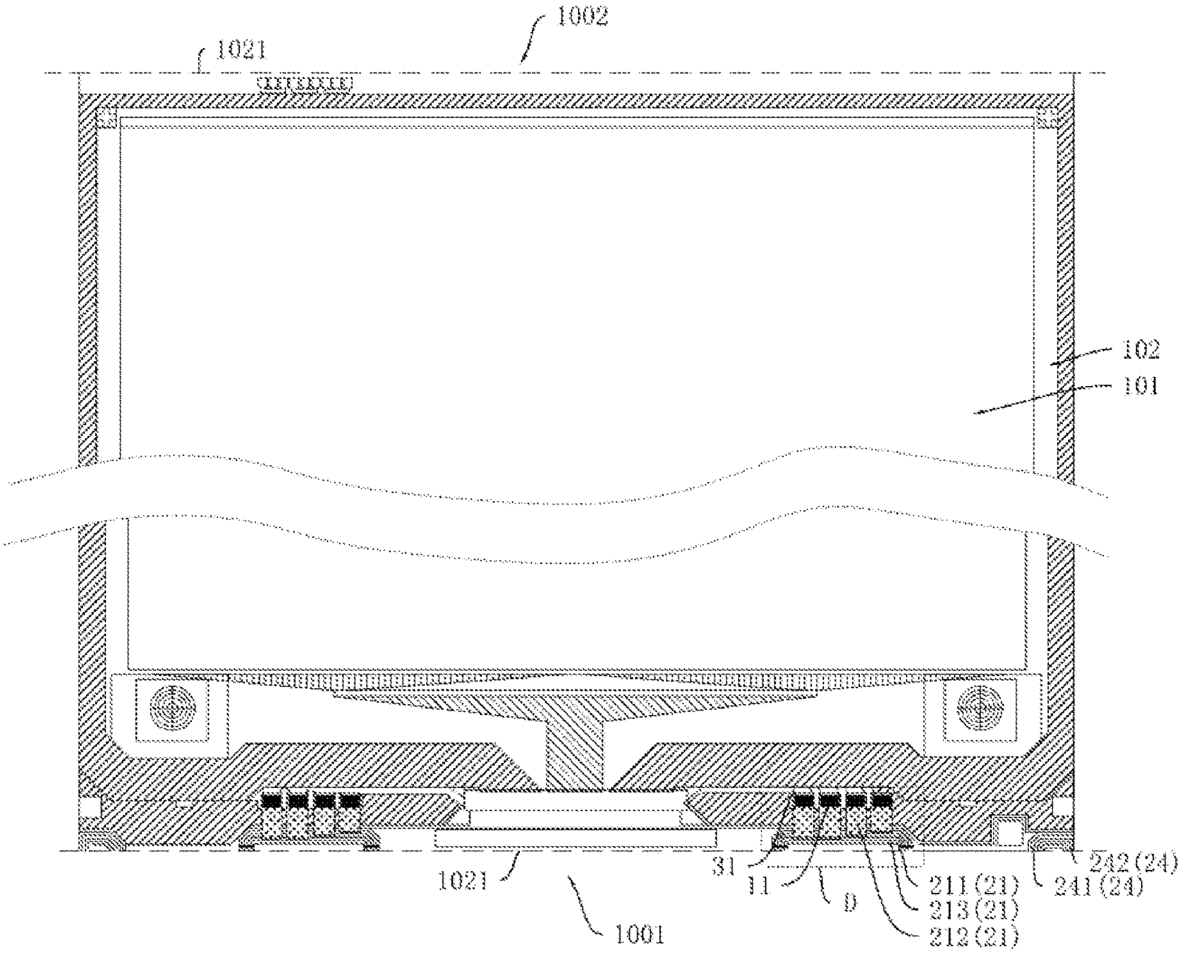
FIG. 14 is a schematic view of another structure of a display panel according to some embodiments of the present disclosure.

In another embodiment, as shown in FIG. 14, the display panel obtained by the edge sub-boards 411 includes only the first metal line segments 21 and the fourth metal line segments 24 on the first side 1001 with respect to the display panel shown in FIG. 7.

In summary, in the embodiments of the present disclosure, the portion of the metal signal lines 20 that are directly connected to the metal terminals 11 and intersect with the cutting line 12 is prepared with a metal oxide, so that the first sub-portions 211 of the first metal line segments 21 that are connected to the outer boundary 1021 is prepared with a metal oxide, thereby reducing the conductivity of the first sub-portions 211, reducing the static electricity generated by the first sub-portions 211, and reducing the probability of electrostatic damage to the wires or components in the display panel. The first sub-portions 211 are made of a metal oxide, so that the probability of water vapor intruding into the interior of the display panel from the first metal line segments 21 can be reduced, and the stability of the display panel and the display effect can be improved.

Moreover, an embodiment of the present disclosure further provides a display device including a display panel as described in the above-described embodiments.

It can be understood that since the display device includes the display panel described in the above embodiments, the display device has the same advantageous effect as the display panel, and details are not repeated herein.

In the above-mentioned embodiments, the description of each embodiment has its own emphasis, and structures not described in detail in a certain embodiment may be referred to the related description of other embodiments.

The display panel, the display panel motherboard, and the display device according to the embodiments of the present disclosure are described in detail. The principles and implements of the present disclosure are described herein using specific embodiments. The description of the above embodiments is merely intended to help understand the technical solution and the core idea of the present disclosure. It can be understood by those of ordinary skill in the art that modifications may still be made to the technical solutions described in the foregoing embodiments, or equivalent substitutions may be made to some of the technical features therein. These modifications or substitutions do not depart the essence of the corresponding technical solutions from the scope of the technical solutions of the embodiments of the present disclosure.

What is claimed is:

1. A display panel comprising a display area and a non-display area adjacent to the display area, the non-display area comprising an outer boundary on a side away from the display area;

wherein the display panel further comprises:

metal terminals disposed in the non-display area; and first metal line segments disposed in the non-display area, wherein one end of each of the first metal line segments is connected to one of the metal terminals, and another end extends to the outer boundary;

wherein the first metal line segments comprise first sub-portions extending to the outer boundary, and the first sub-portions contain a metal oxide.

2. The display panel of claim 1, wherein the display panel comprises a first side and a second side opposite to each other, the first metal line segments are located on the first side, the display panel further comprises second metal line segments on the second side, the first metal line segments extend to the outer boundary on the first side, and the second metal line segments extend to the outer boundary on the second side; and each of the first metal line segments comprises a first end extending to the outer boundary on the first side, and each of the second metal line segments comprises a second end extending to the outer boundary on the second side, and the first end and the second end are disposed opposite to each other in a direction from the first side to the second side.

3. The display panel of claim 2, wherein the second metal line segments comprise second sub-portions extending to the outer boundary on the second side, and third sub-portions connected to a side of the second sub-portions away from the outer boundary, and the second sub-portions and the first sub-portions are disposed opposite to each other in the direction from the first side to the second side; and a material of the second sub-portions is the same as a material of the first sub-portions, and the material of the first sub-portions is less conductive than a material of the third sub-portions.

4. The display panel of claim 3, wherein the display panel further comprises functional signal lines disposed in the non-display area, and driving circuits disposed in the display area and the non-display area, the functional signal lines are electrically connected to the driving circuits, and a spacing between the second metal line segments and the functional signal lines is greater than or equal to 30 microns.

5. The display panel of claim 3, wherein the first metal line segments further comprises fourth sub-portions connected to the metal terminals, and fifth sub-portions connected between the first sub-portions and the fourth sub-portions, and a material of the fifth sub-portions is the same as the material of the third sub-portions.

6. The display panel of claim 3, wherein the display panel further comprises third metal line segments disposed in the non-display area and on the second side, two ends of each of the third metal line segments extend to the outer boundary on the second side, the third metal line segments comprise sixth sub-portions and seventh sub-portions that extend to the outer boundary, the sixth sub-portions are disposed opposite to the first sub-portions in the direction from the first side to the second side, the seventh sub-portions are staggered from the first sub-portions in the direction from the first side to the second side; and a material of the sixth sub-portions is the same as the material of the first sub-portions, a material of the seventh sub-portions is the same as the material of the first sub-portions, or the material of the seventh sub-portions is the same as the material of the third sub-portions.

7. The display panel of claim 6, wherein the display panel further comprises fourth metal line segments disposed in the non-display area on the first side, the fourth metal line segments comprise eighth sub-portions extending to the outer boundary on the first side, the eighth sub-portions and the seventh sub-portions are disposed opposite to each other in the direction from the first side to the second side, a material of the eighth sub-portions is the same as the material of the first sub-portions, or the material of the eighth sub-portions is the same as the material of the third sub-portions.

8. The display panel of claim 3, wherein chemical stability of the material of the first sub-portions is greater than that of the material of the third sub-portions.

9. The display panel of claim 8, wherein the material of the third sub-portions comprises an elemental metal.

10. The display panel of claim 2, wherein the metal terminals are disposed on the first side, and the display panel further comprises a plurality of binding terminals disposed in the non-display area and on the first side, and a driver chip and a flexible circuit board connected to the binding terminals.

11. A display panel motherboard comprising:

at least two sub-boards, each of the sub-boards comprising metal terminals; and a plurality of metal signal lines connected to the metal terminals on the sub-boards, the metal signal lines comprising first metal line segments connected to the metal terminals;

wherein one end of each of the first metal line segments is connected to one of the metal terminals, another end is connected to a juncture of two adjacent sub-boards, the first metal line segments comprises first sub-portions connected to the juncture of two adjacent sub-boards, and the first sub-portions contain a metal oxide.

12. A display device comprising a display panel, the display panel comprising a display area and a non-display area adjacent to the display area, the non-display area comprising an outer boundary on a side away from the display area;

wherein the display panel further comprises:

metal terminals disposed in the non-display area;

first metal line segments disposed in the non-display area, wherein one end of each of the first metal line segments is connected to one of the metal terminals, and another end extends to the outer boundary;

wherein the first metal line segments comprise a first sub-portions extending to the outer boundary, and the first sub-portions contain a metal oxide.

13. The display device of claim 12, wherein the display panel further comprises a first side and a second side opposite to each other, the first metal line segments are located on the first side, the display panel further comprises second metal line segments on the second side, and the first metal line segments extend to the outer boundary on the first side, and the second metal line segments extend to the outer boundary on the second side; and each of the first metal line segments comprises a first end extending to the outer boundary on the first side, and each of the second metal line segments comprises a second end extending to the outer boundary on the second side, and the first end and the second end are disposed opposite to each other in a direction from the first side to the second side.

14. The display device of claim 13, wherein the second metal line segments comprise second sub-portions extending to the outer boundary on the second side, and third sub-portions connected to a side of the second sub-portions away from the outer boundary, and the second sub-portions and the first sub-portions are disposed opposite to each other in the direction from the first side to the second side; and a material of the second sub-portions is the same as a material of the first sub-portions, and the material of the first sub-portions is less conductive than a material of the third sub-portions.

15. The display device of claim 14, wherein the display panel further comprises functional signal lines disposed in the non-display area, and driving circuits disposed in the display area and the non-display area, the functional signal lines are electrically connected to the driving circuits, and a spacing between the second metal line segments and the functional signal lines is greater than or equal to 30 microns.

16. The display device of claim 14, wherein the first metal line segments further comprises fourth sub-portions connected to the metal terminals, and fifth sub-portions connected between the first sub-portions and the fourth sub-portions, and a material of the fifth sub-portions is the same as the material of the third sub-portions.

17. The display device of claim 14, wherein the display panel further comprises third metal line segments disposed in the non-display area and on the second side, two ends of each of the third metal line segments extend to the outer boundary on the second side, the third metal line segments comprise sixth sub-portions and seventh sub-portions extending to the outer boundary, the sixth sub-portions are disposed opposite to the first sub-portions in the direction from the first side to the second side, the seventh sub-portions are staggered from the first sub-portions in the direction from the first side to the second side; and a material of the sixth sub-portions is the same as the material of the first sub-portions, a material of the seventh sub-portions is the same as the material of the first sub-portions, or the material of the seventh sub-portions is the same as the material of the third sub-portions.

18. The display device of claim 17, wherein the display panel further comprises fourth metal line segments disposed in the non-display area on the first side, the fourth metal line segments comprise eighth sub-portions extending to the outer boundary on the first side, the eighth sub-portions and the seventh sub-portions are disposed opposite to each other in the direction from the first side to the second side, a material of the eighth sub-portions is the same as the material of the first sub-portions, or the material of the eighth sub-portions is the same as the material of the third sub-portions.

19. The display device of claim 14, wherein chemical stability of the material of the first sub-portions is greater than that of the material of the third sub-portions.

20. The display device of claim 19, wherein the material of the third sub-portions comprises an elemental metal.

* * * * *